(12) United States Patent
Tanaka

(10) Patent No.: US 6,229,848 B1
(45) Date of Patent: May 8, 2001

(54) RECEPTION-SYNCHRONIZATION PROTECTING DEVICE AND RECEPTION-SYNCHRONIZATION PROTECTION METHOD

(75) Inventor: Hiroshi Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/447,579

(22) Filed: Nov. 23, 1999

(30) Foreign Application Priority Data

Nov. 24, 1998 (JP) .................................................. 10-376427

(51) Int. Cl.⁷ .............................. H04B 17/00; H04L 7/00
(52) U.S. Cl. ........................................... 375/227; 375/354
(58) Field of Search .................................... 375/354, 355, 375/227, 365; 370/503, 512, 513

(56) References Cited

U.S. PATENT DOCUMENTS

| 4,686,673 | * | 8/1987 | Hotta ..................................... | 375/354 |
| 4,972,441 | * | 11/1990 | Roberts et al. ...................... | 375/340 |
| 5,319,679 | * | 6/1994 | Bagdy .................................... | 375/354 |
| 5,524,127 | * | 6/1996 | Petranovich ......................... | 375/368 |
| 5,598,098 | * | 1/1997 | Champlin .............................. | 324/430 |

FOREIGN PATENT DOCUMENTS 9-8858    1/1997   (JP) .

* cited by examiner

Primary Examiner—Tesfaldet Bocure
(74) Attorney, Agent, or Firm—Sughrue, Mion, Zinn, Macpeak & Seas, PLLC

(57) ABSTRACT

A reception-synchronization protecting device comprises strength measuring means, an S/N ratio estimating circuit, a protection window size determining circuit, a timing estimating circuit, and a protection window adding circuit. The strength measuring means is used for measuring a signal strength of a CCS signal contained in a received frame and producing a measured result. The S/N ratio estimating circuit is used for estimating an S/N (a Signal-to-Noise) ratio of the received frame with basing on the measured result previously measured by the signal strength measuring circuit. The protection window size determining circuit is used for determining a size of a protection window with basing on the estimated S/N ratio estimated by the S/N ratio estimating circuit. The timing estimating circuit is used for estimating an expected position of the received frame with basing on the measured result previously measured by the signal strength measuring circuit. The protection window adding circuit is used for adding protection window having the determined size determined by the protection window size determining circuit at each of front and rear ends of an expected timing frame to be contained in the received frame, with basing on the estimated position and the estimated S/N ratio of the received frame respectively estimated by the S/N ratio estimating circuit and the timing estimating circuit.

10 Claims, 4 Drawing Sheets

10: S/N RATIO ESTIMATING CKT
20: PROTECTION WINDOW SIZE DETERMINING CKT
30: TIMING ESTIMATING CKT
40: PROTECTION WINDOW ADDING CKT

1: FREQUENCY ESTIMATING SIGNAL
2: UNIQUE WORD
3: CCS SIGNAL
7: RECEIVED FRAME

1a: CAPTURED PART
1b: NO-CAPTURED PART
3: CCS SIGNAL
6: TIMING FRAME

1a: CAPTURED PART
1b: NO-CAPTURED PART
1c: CAPTURED PART (OVERLAPPED PART)
3: CCS SIGNAL
6: TIMING FRAME

1: FREQUENCY ESTIMATING SIGNAL
1a: CAPTURED PART
3: CCS SIGNAL
5f, 5r : PROTECTION WINDOW
6: TIMING FRAME

1: FREQUENCY ESTIMATING SIGNAL
1a: CAPTURED PART
3: CCS SIGNAL
5f, 5r : PROTECTION WINDOW
6: TIMING FRAME

RECEPTION-SYNCHRONIZATION PROTECTING DEVICE AND RECEPTION-SYNCHRONIZATION PROTECTION METHOD

BACKGROUND OF THE INVENTION

This invention relates to a digital exchange technique and, more particularly, to a reception-synchronization protecting device and a reception-synchronization protecting method used in a common line signaling technique. In the common line technique, speech and data information and a control signal are separated and then transmitted over a separately arranged speech line and a signal line when a plurality of exchanges are connected through a communication network.

Along with today's rapid advancement of a multimedia communication, such as the Internet, the common line signaling technique has dramatically advanced. In the common line signaling technique, speech and data information and a control signal are separated and then transmitted over a separately arranged speech line and a signal line to each other when a plurality of exchanges are connected through a communication network. Japanese Unexamined Patent Publication (A) No. 8858/1997 discloses such conventional common line signaling techniques.

In this disclosed conventional art, a timing reproducing circuit reproduces a clock signal from carrier data signals that have arrived at a hub station in a burst form in different phases from a plurality of terminals. The timing reproducing circuit comprises a level detector circuit, a carrier demodulator circuit, a gating circuit, a digital phase-locked loop (DPLL) circuit, and a discrimination circuit.

The level detector circuit is used for detecting the arrival of a carrier data signal and outputting a control signal. The carrier demodulator circuit is used for demodulating the carrier data signal into a baseband burst data signal. The gating circuit is used for extracting a particular signal from the demodulated baseband burst signal. The DPLL circuit is used for reproducing a clock signal in synchronization with the baseband burst data signal, using the particular signal. The discrimination circuit is used for discriminating the baseband burst data signal using the reproduced clock signal.

The baseband burst data signal from each terminal includes a preamble (PR) signal for establishing a bit synchronization, a unique word signal for establishing a frame synchronization, and data signal bearing information. The particular signal is the preamble signal.

According to the disclosure, since the gating circuit extracts the PR signal from the baseband burst data signal using the control signal, and by adding only the PR signal to the DPLL circuit, a timing reproduction is reliably performed without erratic frame synchronization in a guard time.

In the conventional art, it is however unknown what frequency a reception signal firstly exists when an initial synchronization is going to be established. To settle this, the reception signal is firstly detected so that synchronizations of a frequency and a clock timing are established early. In this event, if a synchronization frame (timing frame) to be synchronized suffers from a timing error, the power of a synchronization signal is reduced. In particular, when a synchronization timing is delayed caused by the timing error, a CCS (Common Line Signal) signal contained in a received frame is affected by a frequency estimating signal contained in the received frame. Namely, the frequency estimating signal partially overlaps onto the CCS signal so as to make an overlapped part in the CCS signal. The overlapped part becomes a noise component for the received frame. As a result, the received signal is reduced in a relative S/N (signal-to-noise) ratio.

SUMMARY OF THE INVENTION

It is an object of this invention to solve the disadvantages mentioned above and to therefore provide a reception-synchronization protecting device and a reception-synchronization protecting method capable of minimizing a power loss caused by an overlap of the frequency estimating signal on the CCS signal with a synchronization frame suffered from a timing error and thereby reducing an erroneous detection of the frequency estimating signal caused by a degradation of a signal strength.

The other object, features, and advantages of this invention will become clear as the description proceeds.

This invention is directed to a reception-synchronization protecting device which comprises strength measuring means for measuring a signal strength of the CCS signal contained in a received frame and producing a measured result, S/N ratio estimating means for estimating an S/N (a Signal-to-Noise) ratio of the received frame with basing on the measured result previously measured by the signal strength measuring means, protection window size determining means for determining a size of a protection window with basing on the estimated S/N ratio estimated by the S/N ratio estimating means, timing estimating means for estimating an expected position of the received frame with basing on the measured result previously measured by the signal strength measuring means, and protection window adding means for adding protection window having the determined size determined by the protection window size determining means at each of front and rear ends of an expected timing frame to be contained in the received frame, with basing on the estimated position and the estimated S/N ratio of the received frame respectively estimated by the S/N ratio estimating means and the timing estimating means.

This invention is further directed to a reception-synchronization protecting method which comprises a signal strength measuring step for measuring a signal strength of a CCS (Common Line Signal) signal contained in a received frame and producing a measured result, an S/N ratio estimating step for estimating an S/N ratio of a received frame with basing on the measured result previously measured in the signal strength measuring step, a protection window size determining step for determining a size of a protection window with basing on the estimated S/N ratio estimated in the S/N ratio estimating step, a timing estimating step for estimating an expected position of the received frame with basing on the measured result previously measured in the signal strength measuring step, and a protection window adding step for adding protection window having the determined size determined in the protection window size determining step at each of front and rear ends of an expected timing frame to be contained in the received frame, with basing on the estimated position of the received frame and the estimated S/N ratio of the received frame respectively estimated in the S/N ratio estimating step and the timing estimating step.

DESCRIPTION OF THE PREFERRED EMBODIMENTS

Figure 1:
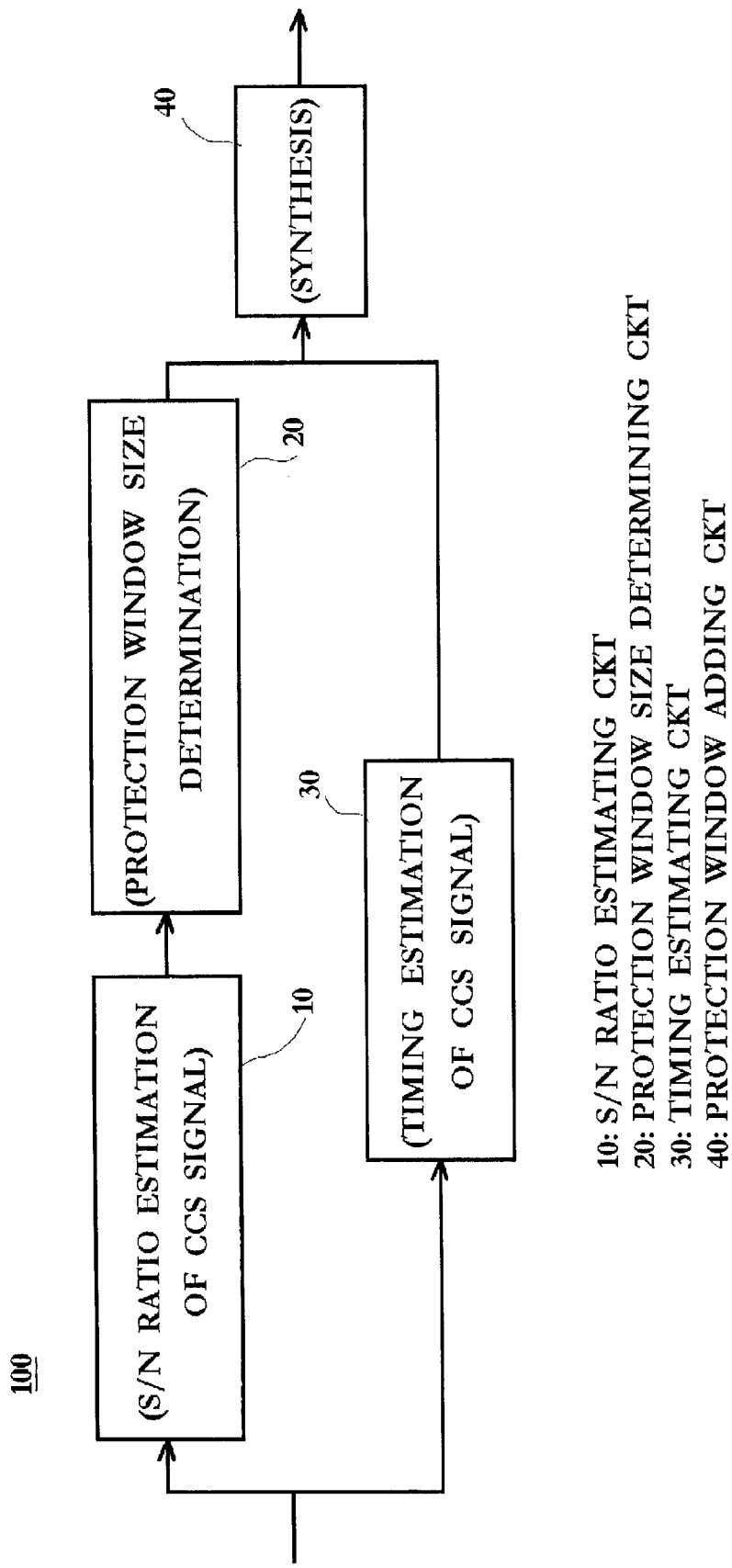
FIG. 1 is a functional block diagram showing one embodiment of a reception-synchronization protecting device of this invention.

Two embodiments according to this invention will be described with referring to the drawings.

First embodiment

Figure 2:
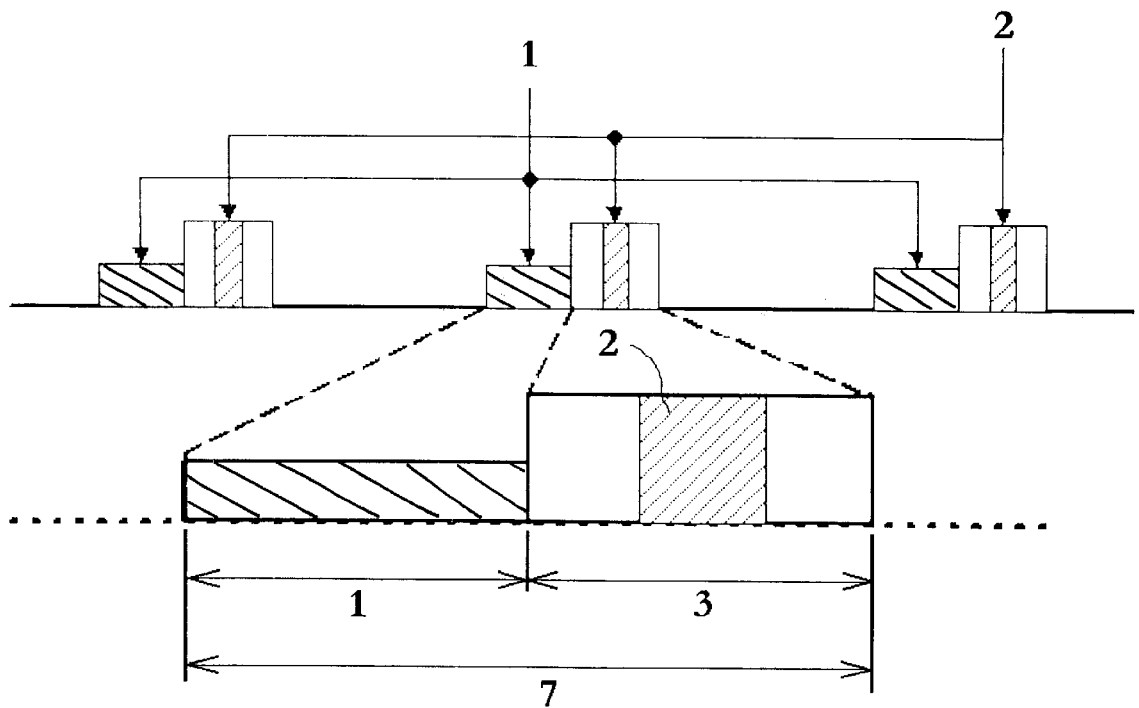
FIG. 2 shows a TDMA (Time Division Multiple Access) burst format, which is one example of the burst formats usable in the reception-synchronization protecting device of this invention.

FIG. 1 is a functional block diagram showing one embodiment of a reception-synchronization protecting device 100 of this invention. FIG. 2 shows a TDMA (Time Division Multiple Access) format, one of techniques usable in the reception-synchronization protecting device 100 of this invention.

Referring to FIG. 1, the reception-synchronization protecting device 100 comprises an S/N ratio estimating circuit 10, a protection window size determining circuit 20, a timing estimating circuit 30, and a protection window adding circuit 40.

Referring to FIGS. 1 and 2, the reception-synchronization protecting device 100 has a function of memorizing an error distribution of a CCS (Common Line Signal) 3 for each S/N (signal-to-noise) ratios previously provided by a numerical calculation, a function of correcting the error distribution of the CCS signal according to an actual measured value, a function of preventing a signal degradation of a received frame 7 by enlarging or reducing the sizes of protection windows according to the S/N ratio previously estimated, and a function of minimizing a power loss by respectively arranging or forming, at front and rear ends of the received frame 7, the protection windows asymmetrical to each other. The power loss is caused by an overlap of a frequency estimating signal 1 on a CCS signal 3. The overlap is attributed to a timing error of a timing frame.

With a structure mentioned above, the reception-synchronization protecting device 100 can reduce an erroneous detection of the frequency estimating signal 1 attributed to the degradation of signal strength.

The S/N ratio estimating circuit 10 has a function of estimating the S/N ratio of the received frame 7, based on the result of prior measurements of the signal strength of the CCS signal 3 contained in the received frame 7 (corresponding to the block labeled "S/N RATIO ESTIMATION OF CCS SIGNAL" in FIG. 1).

The protection window size determining circuit 20 has a function of determining the size of the protection windows based on the estimated S/N ratio. Specifically, the protection window size determining circuit 20 estimates the sizes of the protection windows 5f and 5r that properly match the S/N ratio of the received frame 7, based on a relationship between a timing distribution of the CCS signal 3 and a signal strength degradation caused by a timing error of the received frame 7 (corresponding to the block labeled "PROTECTION WINDOW SIZE DETERMINATION" in FIG. 1).

The protection window size determining circuit 20 determines at least one of the profile of the protection window at the front end of the received frame 7 and the profile of the protection window at the rear end of the received frame 7, in order to minimize the power loss caused by the timing error of the timing frame. The protection window size determining circuit 20 sets, to be asymmetrical, at least one of the profile of the protection window at the front end of the received frame 7 and the profile of the protection window at the rear end of the received frame 7 in order to minimize the power loss.

The timing estimating circuit 30 has a function of estimating the expected position of the received frame 7, based on the result of the prior measurement of the signal strength of the CCS signal 3 contained in the received frame 7.

The timing estimating circuit 30 determines the positions of addition of the protection windows which properly match the S/N ratio of the received frame 7, based on a relationship between the timing distribution of the CCS signal 3 and the signal strength degradation caused by the timing error of the received frame 7 (corresponding to the block labeled "TIMING ESTIMATION OF CCS SIGNAL" in FIG. 1).

The protection window adding circuit 40 adds the protection windows having the determined sizes at each of front and rear ends of an expected timing frame contained in the received frame 7, with basing on the estimated position (timing) of the received frame 7 and the estimated S/N ratio of the received frame 7 (corresponding to the block labeled "SYNTHESIS").

When the reception-synchronization protecting device 100 receives multi frames, which are constructed of the CCS signal 3, including the frequency estimating signal 1 having several tens of symbols and a unique word 2 having several tens of symbols, the reception-synchronization protecting device 100 adds the protection windows at the front and the rear ends of the frame for establishing synchronization or a frame for required data.

An operation of the reception-synchronization protecting device 100 will be described.

The reception-synchronization protecting device 100 performs a reception-synchronization protecting method according to this embodiment. The reception-synchronization protecting method comprises an S/N ratio estimating step, a protection window size determining step, a timing estimating step, and a protection window adding step.

The reception-synchronization protecting method has a function of memorizing the error distribution of the CCS signal 3 for each S/N ratio previously provided by a numerical calculation and correcting the error distribution according to the actual measurement, a function of preventing the signal degradation of the received frame 7 by enlarging or reducing the sizes of protection windows according to the estimated S/N ratio, and a function of minimizing the power loss resulting from the overlap of the frequency estimating signal 1 attributed to the timing error of the timing frame, by respectively arranging the asymmetrical protection windows at the front and the rear ends of the synchronization frame.

In the S/N ratio estimating step, the S/N ratio estimating circuit 10 estimates the S/N ratio of the received frame 7, based on the result of the prior measurement of the signal strength of the CCS signal 3 contained in the received frame 7.

The protection window size determining step, that is executed by the protection window size determining circuit 20, includes a step of estimating the sizes of the protection windows that properly match the S/N ratio of the received frame 7, based on the relationship between the timing distribution of the CCS signal 3 and the signal strength degradation caused by the timing error of the received frame 7. The protection window size determining step further includes a step of determining at least one of the profile of the protection window at the front end of the received frame 7 and the profile of the protection window at the rear end of the received frame 7, in order to minimize the power loss resulting from the overlap of the frequency estimating signal 1. The protection window size determining step further includes a step of setting to be asymmetrical at least one of the profile of the protection window at the front end of the received frame 7 and the profile of the protection window at the rear end of the received frame 7, in order to minimize the power loss resulting from the overlap of the frequency estimating signal 1.

In the timing estimating step, the timing estimating circuit 30 estimates the expected position of the received frame 7, based on the result of the prior measurement of the signal strength of the CCS signal 3 contained in the received frame 7. The timing estimating step also includes a step of determining the positions of addition of the protection windows which properly match the S/N ratio of the received frame 7, based on the relationship between the timing distribution of the CCS signal 3 and the signal strength degradation caused by the timing error of the received frame 7.

In the protection window adding step, the protection window adding circuit 40 adds the protection windows having the determined sizes at the front and the rear ends of the desired timing frame contained in the received frame 7, with basing on the estimated position (timing) of the received frame 7 and the estimated S/N ratio of the received frame 7.

Figure 3:
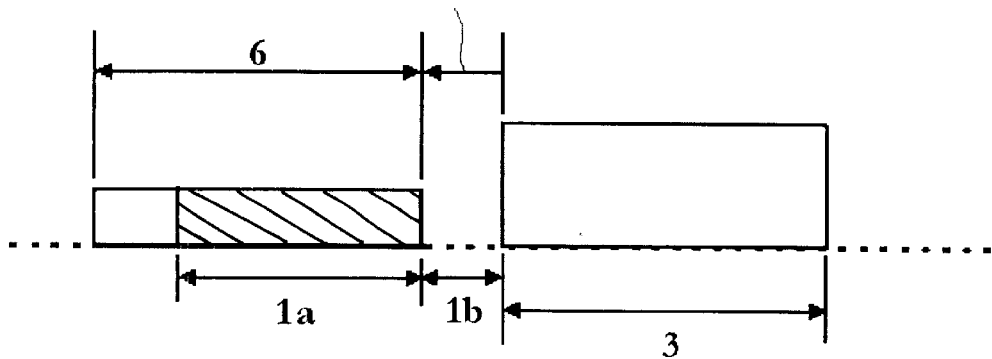
FIG. 3 shows the case in which a timing frame is shifted into an adjacent frame due to the error of a reception timing when the frame format shown in FIG. 2 is being received, wherein the timing frame is in error (shifted to the left)

FIG. 3 shows a case in which a timing frame 6 is deviated or shifted caused by an error of a reception timing. The timing frame 6 is deviated towards the left in FIG. 3. As shown in FIG. 3, there are occasionally cases when the timing frame 6 is deviated towards the left caused by the reception timing error when the frame format shown in FIG. 2 is being received. In this case, a part of the frequency estimating signal which is synchronized with the timing frame is captured (received) and becomes a captured part 1a. However, a part of the frequency estimating signal which is not synchronized with the timing frame is not captured and becomes a no-captured part 1b.

Figure 4:
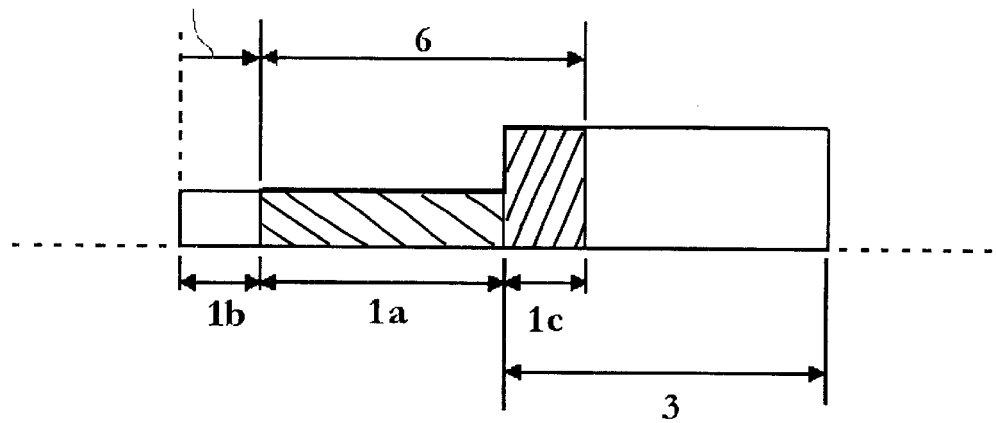
FIG. 4 shows the case in which the timing frame is shifted into an adjacent frame due to the error of the reception timing when the frame format shown in FIG. 2 is being received, in which the timing frame is in error (shifted to the right)

FIG. 4 also shows a case in which the timing frame 6 is deviated caused by an error of a reception timing. The timing frame 6 is deviated towards the right in FIG. 4. As shown in FIG. 4, there are occasionally cases when the timing frame 6 is deviated towards the right caused by the reception timing error when the frame format shown in FIG. 2 is being received. In this case, a part of the frequency estimating signal which is not synchronized with the timing frame is not captured and becomes the no-captured part 1b. On the other hand, a part of the frequency estimating signal which is synchronized with the timing frame is captured. However, a part of the captured part without the captured part 1a is a captured part (an overlapped part) 1c. The overlapped part 1c overlaps on the CCS signal 3 and becomes a noise component for the received frame.

To avoid such a problem, in the reception-synchronization protecting method according to the embodiment of this invention, the signal strength of the CCS signal 3 is beforehand measured, the position (timing) and the S/N ratio of the signal are estimated from the signal strength of the CCS signal 3, and the protection windows are respectively added at the front and the rear ends of the desired timing frame 6.

Figure 5:
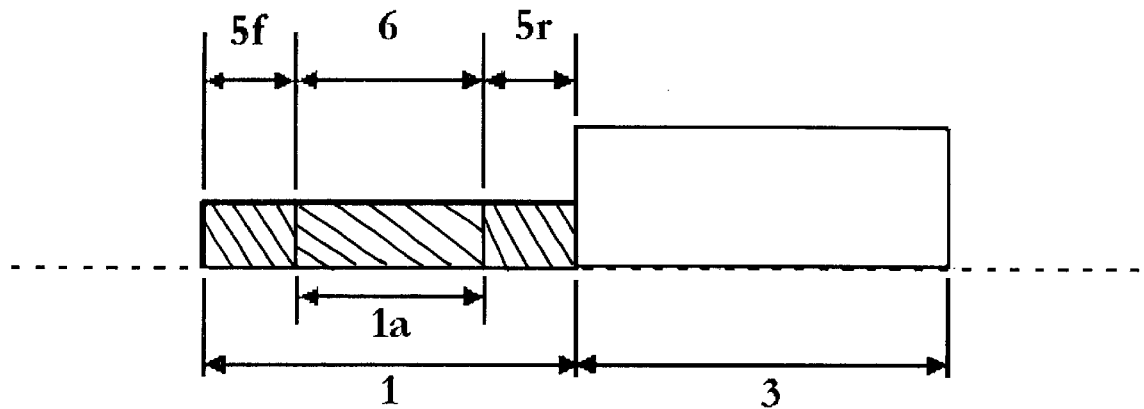
FIG. 5 shows a frame construction diagram in which a desired frame is associated with protection windows.

FIG. 5 is a frame construction diagram showing a desired frame associated with protection windows 5f and 5r capable of being added to the desired frame.

The sizes and the positions of the protection windows 5f and 5r shown in FIG. 5 are optimized for the S/N ratio of the received frame 7, based on the relationship between the timing distribution of the CCS signal 3 and the signal strength degradation caused by the timing error of the received frame 7. The protection windows 5f and 5r are estimated and added, as necessary. When a timing error occurs in the received frame 7, an apparent S/N ratio degradation is thus avoided. In this embodiment, the timing distribution of the CCS signal 3 in the initial stage of operation is provided for each S/N ratio, and the value of the timing distribution is corrected referring to each actual measurement value in operation.

Figure 6:
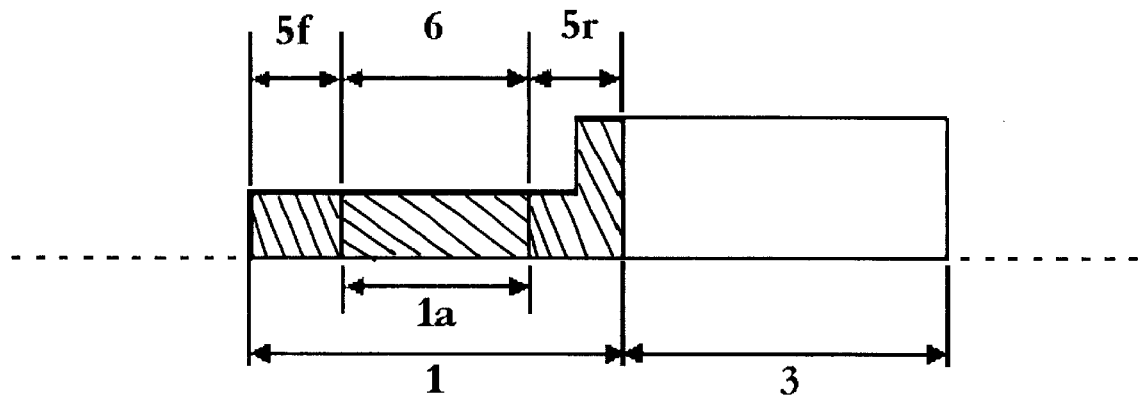
FIG. 6 shows a frame construction diagram in which a desired frame is associated with protection windows.

FIG. 6 shows a timing error within the protection windows 5f and 5r in FIG. 5. In this embodiment, the asymmetrical protection windows 5f and 5r are respectively arranged to minimize the power loss caused by the overlap of the frequency estimating signal attributed to the timing error of the synchronization frame. Specifically, at least one of the protection window 5f at the front end of the received frame 7 and the protection window 5r at the rear end of the received frame 7 is set to be in an asymmetrical profile in order to minimize the power loss. This arrangement reduces the power loss. This arrangement therefore reduces the erroneous detection of the frequency estimating signal attributed to the degradation of the signal strength.

To sum up the first embodiment, because the protection windows 5f and 5r are added at the front and the rear ends of the timing frame 6 reduces, respectively, an influence from the adjacent frame is reduced if the reception timing error has a length within the protection windows 5f and 5r. Furthermore, the timing error and the S/N ratio are predicted in a degree by referring to the CCS signal 3. The timing distribution is corrected as necessary according to the actual measurement values. The front protection window 5f and the rear protection window 5r are maintained at an optimum size.

Second embodiment

In a second embodiment of this invention, FIGS. 5 and 6 are used for assisting a description of this embodiment.

Referring to FIGS. 5 and 6, a reception-synchronization protecting device of the embodiment can optimize sizes of the front and the rear protection windows 5f and 5r according to the S/N ratio with the received frame in timing error, and which can thus reduce the degradation in the S/N ratio. This embodiment is applied not only to the burst format for establishing initial synchronization as shown in FIG. 2, but also to the burst format which are associated with adjacent data signals at the front thereof and at the rear of the frequency estimating signal 1.

To sum up the second embodiment, the addition of the protection windows 5f and 5r respectively added at the front and the rear ends of the timing frame 6 reduces the influence of the adjacent frame if the reception timing error falls within the protection windows 5f and 5r. The timing error and the S/N ratio are predicted to some degree referring to the CCS signal 3. The timing distribution is corrected as necessary according to the actual measurement values. The front protection window 5f and the rear protection window 5r are maintained at an optimum size.

Arranging the asymmetrical protection windows at the front and the rear ends of the timing frame minimizes the power loss resulting from the overlap of the frequency estimating signal with the synchronization frame in timing error. This arrangement therefore reduces the erroneous detection of the frequency estimating signal attributed to the degradation of signal strength.

While the invention has thus far been described in conjunction with the two embodiments thereof, it will readily be possible to put this invention into any common line signaling technique in various other manners.

The number, positions, and shapes of the constituent parts are not limited to the above-mentioned embodiments, and may be modified to any number, positions, and shapes as long as these are appropriate in carrying out this invention. Throughout the drawings, like components are identified with like reference numerals.

What is claimed is:

1. A reception-synchronization protecting device comprising:

strength measuring means for measuring a signal strength of a CCS (Common Line Signal) signal contained in a received frame and producing a measured result;

S/N ratio estimating means for estimating an S/N (a Signal-to-Noise) ratio of the received frame based on said measured result previously measured by said strength measuring means;

protection window size determining means for determining a size of a protection window based on the estimated S/N ratio estimated by said S/N ratio estimating means;

timing estimating means for estimating an expected position of the received frame based on said measured result previously measured by said strength measuring means; and protection window adding means for adding protection window having the determined size determined by said protection window size determining means at each of front and rear ends of an expected timing frame to be contained in the received frame, based on the estimated expected position and the estimated S/N ratio of the received frame respectively estimated by said S/N ratio estimating means and said timing estimating means.

2. A reception-synchronization protecting device as claimed in claim 1, wherein said protection window size determining means determines the size of the protection window as to be the most suitable for the estimated S/N ratio estimated by said S/N ratio estimating means, based on a relationship between a timing distribution of the CCS signal and a signal strength degradation caused by a timing error of the received frame.

3. A reception-synchronization protecting device as claimed in claim 1, wherein the timing estimating means determines the expected position for adding the protection window as to be the most suitable for the estimated S/N ratio estimated by said S/N ratio estimating means, based on a relationship between a timing distribution of the CCS signal and a signal strength degradation caused by a timing error of the received frame.

4. A reception-synchronization protecting device as claimed in claim 1, wherein said protection window size determining means determines a profile of at least one of the protection windows at the front and the rear ends of the received frame, and which thereby minimizes a power loss caused by a timing error of an actual timing frame.

5. A reception-synchronization protecting device as claimed in claim 1, wherein said protection window size determining means determines profiles of the protection windows at the front and the rear ends of the received frame so that the profiles are asymmetrical to each other, and which thereby minimizes a power loss caused by a timing error of an actual timing frame.

6. A reception-synchronization protecting method comprising:

a signal strength measuring step for measuring a signal strength of a CCS (Common Line Signal) signal contained in a received frame and producing a measured result;

an S/N ratio estimating step for estimating an S/N (a signal-to-noise) ratio of the received frame based on said measured result previously measured in said strength measuring step;

a protection window size determining step for determining a size of a protection window based on the estimated S/N ratio estimated in said S/N ratio estimating step;

a timing estimating step for estimating an expected position of the received frame based on said measured result previously measured in said strength measuring step; and a protection window adding step for adding protection window having the determined size determined in said protection window size determining step at each of front and rear ends of an expected timing frame to be contained in the received frame, based on the estimated expected position of the received frame and the estimated S/N ratio of the received frame respectively estimated in said S/N ratio estimating step and said timing estimating step.

7. A reception-synchronization protecting method as claimed in claim 6, wherein said protection window size determining step comprises a step of determining the size of the protection window as to be the most suitable for thee estimated S/N ratio estimated in said S/N ratio estimating step, based on a relationship between a timing distribution of the CCS signal and a signal strength degradation caused by a timing error of the received frame.

8. A reception-synchronization protecting method as claimed in claim 6, wherein said timing estimating step comprises a step of determining the expected position for adding the protection window as to be the most suitable for the estimated S/N ratio estimated in said S/N ratio estimating step, based on a relationship between a timing distribution of the CCS signal and a signal strength degradation caused by a timing error of the received frame.

9. A reception-synchronization protecting method as claimed in claim 6, wherein said protection window size determining step comprise a step of determining a profile of at least one of the protection windows at the front and the rear ends of the received frame and a step of thereby minimizing a power loss caused by a timing error of an actual timing frame.

10. A reception-synchronization protecting method as claimed in claim 6, wherein said protection window size determining step comprises a step of determining profiles of the protection windows at the front and the rear ends of the received frame so that the profiles are asymmetrical to each other and a step of thereby minimizing a power loss caused by a timing error of an actual timing frame.

* * * * *